United States Patent [19]

Ault et al.

[11] Patent Number: 5,523,031

[45] Date of Patent: *Jun. 4, 1996

[54] METHOD FOR FIBERIZING MINERAL MATERIAL WITH ORGANIC MATERIAL

[75] Inventors: Patrick L. Ault; Michael T. Pellegrin; James E. Loftus, all of Newark, Ohio

[73] Assignee: Owens-Corning Fiberglas Technology, Inc., Summit, Ill.

[*] Notice: The term of this patent shall not extend beyond the expiration dat of Pat. No. 5,523,032.

[21] Appl. No.: 363,504

[22] Filed: Dec. 23, 1994

[51] Int. Cl.[6] .............................. C03B 37/04; D01D 5/00
[52] U.S. Cl. .................... 264/6; 65/455; 65/460; 264/8; 264/115; 264/121; 264/122; 264/211.1; 264/211.11
[58] Field of Search .................. 264/6, 8, 115, 264/121, 122, 211.1, 211.11; 65/447, 450, 451, 455, 460

[56] References Cited

U.S. PATENT DOCUMENTS

| | | | |
|---|---|---|---|
| 2,944,284 | 7/1990 | Tillotson | 65/447 |
| 3,830,638 | 8/1974 | Jumentier et al. | 65/518 |
| 3,841,854 | 10/1974 | Periat et al. | 65/521 |
| 4,380,570 | 4/1983 | Schwartz | 428/296 |
| 4,731,215 | 3/1988 | Schwartz | 264/517 |
| 4,790,736 | 12/1988 | Kuechel | 425/66 |
| 4,937,020 | 6/1990 | Wagner et al. | 264/6 |
| 5,114,631 | 5/1992 | Nyssen et al. | 264/6 |
| 5,232,638 | 8/1993 | Theissen et al. | 264/6 |
| 5,242,633 | 9/1993 | Rook et al. | 264/8 |

Primary Examiner—Leo B. Tentoni
Attorney, Agent, or Firm—C. M. Gegenheimer; Ted C. Gillespie

[57] ABSTRACT

A method for fiberizing mineral material with organic material includes centrifuging mineral fibers from molten mineral material with a first spinner rotating about an axis, changing the direction of the mineral fibers to form a downwardly moving veil of mineral fibers, establishing a flow of molten organic material moving downwardly in a first conduit positioned within the veil, and directing the flow of molten organic material to a position beneath the spinner, dividing the flow of molten organic material into a plurality of streams, directing, by means of individual conduits, individual ones of the plurality of streams radially outwardly away from the first conduit, rotating the individual conduits about the axis, centrifuging organic fibers from the molten organic material by means of nozzles at the radially outward ends of the individual conduits, and directing the organic fibers into contact with the veil of mineral fibers.

20 Claims, 3 Drawing Sheets

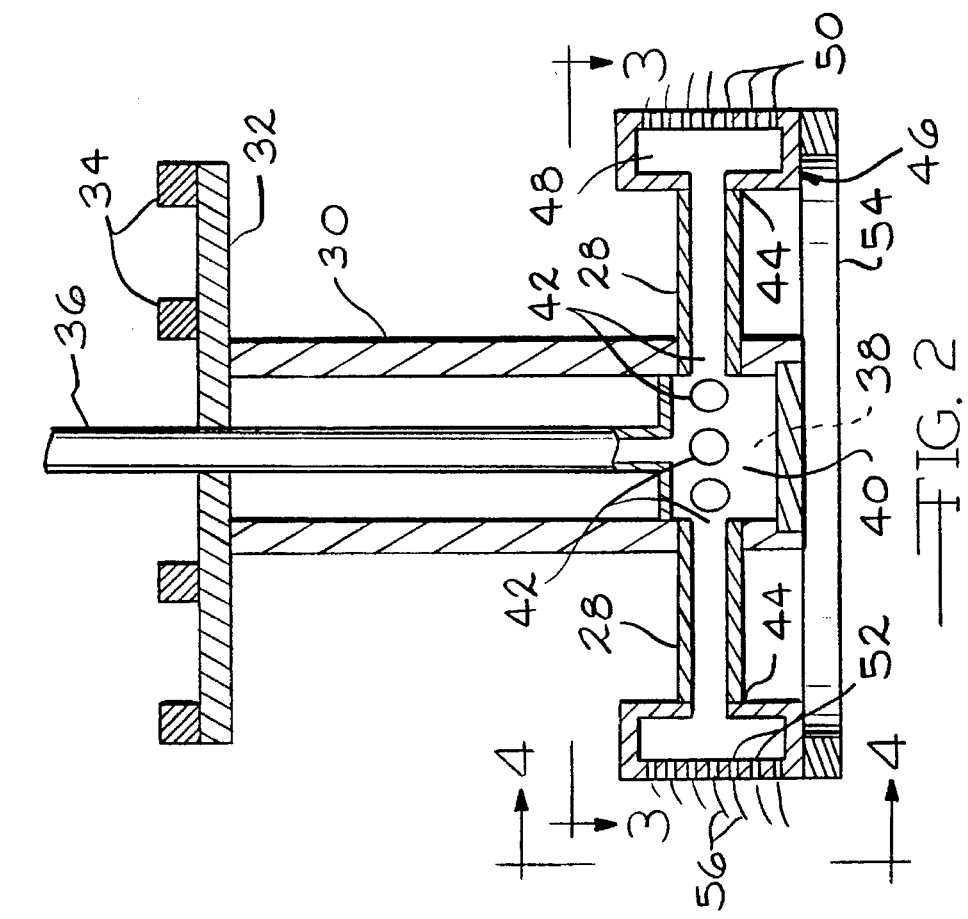
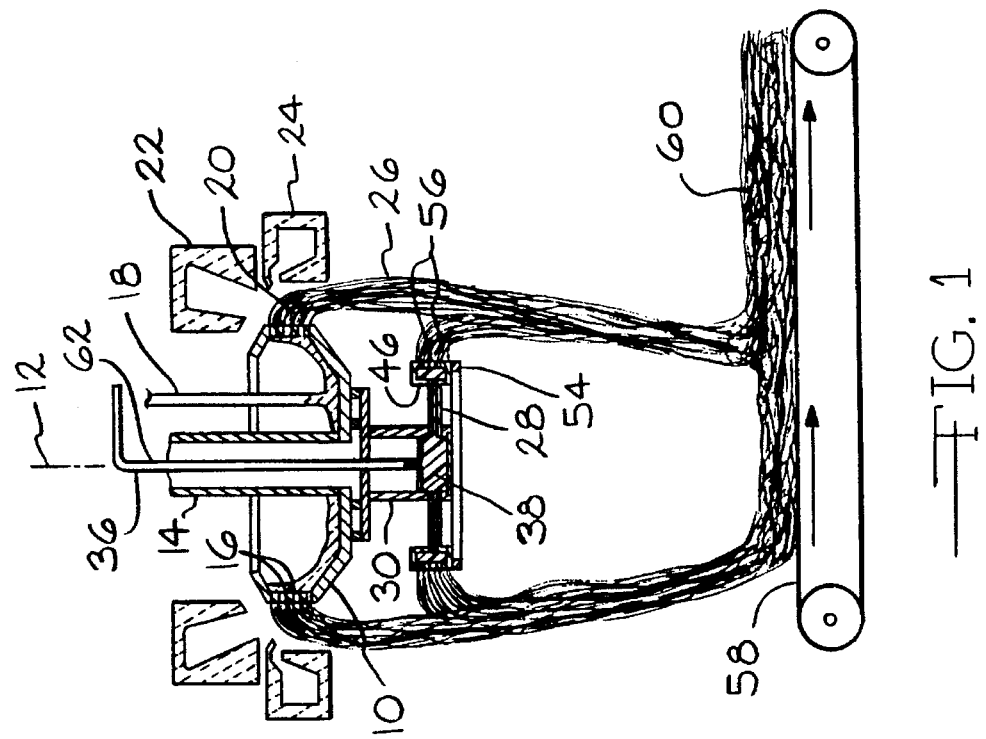
FIG. 2
FIG. 1

5,523,031

METHOD FOR FIBERIZING MINERAL MATERIAL WITH ORGANIC MATERIAL

TECHNICAL FIELD

This invention relates to the production of mineral fiber products, and in particular, mineral fiber products having organic or polymeric material applied to the mineral fibers. More particularly, this invention relates to simultaneously centrifuging fibers from molten mineral material and molten organic material.

BACKGROUND

Mineral fibers, such as glass fibers, are useful for insulation and structural products. Glass fibers for such products are typically made by feeding molten glass into a spinner, and centrifuging the fibers by rotating the spinner to form a downwardly moving cylindrical veil of glass fibers. Applied to the fibers are various organic coatings, particularly binders for binders connecting the mineral fibers to each other to form insulation or structural products. Glass fiber insulation products are typically bonded together by urea phenol/formaldehyde binder to form a spring-like matrix which can recover after compression during packaging of the product. Typical urea phenol/formaldehyde binders have a molecular weight of about 600 in the uncured state, and these binders are usually applied in an aqueous medium by spraying onto the glass fibers shortly after the fibers are formed.

One of the problems with applying aqueous organic binders of the prior an to cylindrical veils of mineral fibers is that a portion of the binder tends to evaporate prior to contact between the liquid binder drop and a mineral fiber in the veil. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect.

A recently developed process to apply higher molecular weight binders to glass fibers uses a first spinner to produce a downwardly moving veil of glass fibers and a second spinner, positioned within the veil, to form polymer fibers and to distribute them into contact with the glass fibers in the veil. This process produces a commingled insulation pack having some polymer fibers and some glass fibers having a polymer coating. This cofiberizing process is described in U.S. patent application Ser. No. 08/079,413, which is hereby incorporated by reference, and which was filed Jun. 23, 1993, naming Bakhshi et al. as inventors, and is assigned to the assignee of the present invention.

One of the problems with the cofiberizing approach to intermingling polymeric or organic material with glass fibers is that the polymeric material is exposed to a hostile environment. The polymer spinner is of necessity positioned directly beneath the glass spinner in order to have the polymer material intersecting the veil of glass fibers at a high enough level for effective commingling. The glass spinner is operated at nearly 2000° F. and a considerable amount of heat is transferred via radiation, conduction and convection toward the polymer spinner and the polymer material within the spinner. Excessive heating of the polymer material causes degradation of the polymer. Even more troublesome is the problem of fires. If the polymeric material is exposed to air and elevated temperatures, a portion of the polymeric material will vaporize and the combustion process will commence. Burning polymeric material is an unacceptable side effect of the process. It would be advantageous for a cofiberizing process to be able to deliver the polymeric material to the spinner in a manner which minimizes the thermal degradation of the polymeric material, and which reduces the exposure of molten polymeric material to air to prevent combustion.

DISCLOSURE OF INVENTION

There has now been developed a method and apparatus for improving a cofiberizing process by shielding the molten polymeric material in the polymer spinner from exposure to some of the heat of the glass spinner, and from contact with air to prevent fires.

According to this invention, there is now provided a method for fiberizing mineral material with organic material including centrifuging mineral fibers from molten mineral material with a first spinner rotating about an axis, changing the direction of the mineral fibers to form a downwardly moving veil of mineral fibers, establishing a flow of molten organic material moving downwardly in a first conduit positioned within the veil, directing the flow of molten organic material to a position beneath the spinner, dividing the flow of molten organic material into a plurality of streams, directing, by means of individual conduits, individual ones of the plurality of streams radially outwardly away from the first conduit, rotating the individual conduits about the axis, centrifuging organic fibers from the molten organic material by means of nozzles at the radially outward ends of the individual conduits, and directing the organic fibers into contact with the veil of mineral fibers. By shielding the molten organic material from heat, the organic material is less subject to thermal degradation, and the molten organic material can be maintained at a relatively cool temperature until the last moment, just before going through the peripheral walls of the nozzles. By shielding the organic material from exposure to air, there is likely to be less chance of fire.

In a specific embodiment of the invention, the conduits are rotating at the same speed or rotational rate as the second rotating spinner.

In another specific embodiment of the invention, the flow of molten material through the nozzles is restricted so that no air enters the individual conduits. The conduits can be insulated to shield the molten organic material from heat from the first rotating spinner.

In yet another embodiment of the invention, the nozzles comprise chambers positioned at the radially outward ends of the individual conduits, with the ratio of the area of the nozzle peripheral walls to the cross-sectional area of the individual conduits being within the range of from about 10 to about 100, and preferably within the range of from about 20 to about 50.

The nozzle chambers preferably have an orificed peripheral wall with at least 50 orifices, and more preferably at least 100 orifices.

In yet another embodiment of the invention the flow of molten organic material is established at a gauge pressure of at least 50 psi (345 KPa). Preferably, the pressure is at least 100 psi (690 KPa).

The nozzles preferably have peripheral walls with an orifice area within the range of from about 5 to about 50 percent of the total area of the peripheral wall, and more preferably an orifice area within the range of from about 15 to about 35 percent of the total area of the peripheral wall of the nozzles.

In yet another embodiment of the invention, the nozzles are connected together to comprise an annular manifold having a peripheral wall with at least 400 orifices.

According to this invention, there is also provided apparatus for fiberizing mineral material with organic material including a first spinner mounted for rotation about an axis to form mineral fibers, means for changing the direction of the mineral fibers to form a downwardly moving veil of mineral fibers, a first conduit for directing the flow of molten organic material to a position beneath the spinner, means for dividing the flow of molten organic material into a plurality of streams, individual conduits for directing the plurality of streams radially outwardly away from the first conduit, nozzles at the radially outward ends of the individual conduits, and means for rotating the individual conduits about the axis to centrifuge organic fibers from the molten organic material and to direct the organic fibers into contact with the veil of mineral fibers.

BRIEF DESCRIPTION OF DRAWINGS

FIG. 1 is a schematic cross-sectional view in elevation of apparatus for cofiberizing glass fibers and fibers of polymeric material according to the invention.

FIG. 2 is a schematic cross-sectional view in elevation of the polymer individual conduits and nozzles of FIG. 1.

BEST MODE FOR CARRYING OUT THE INVENTION

Figure 4:
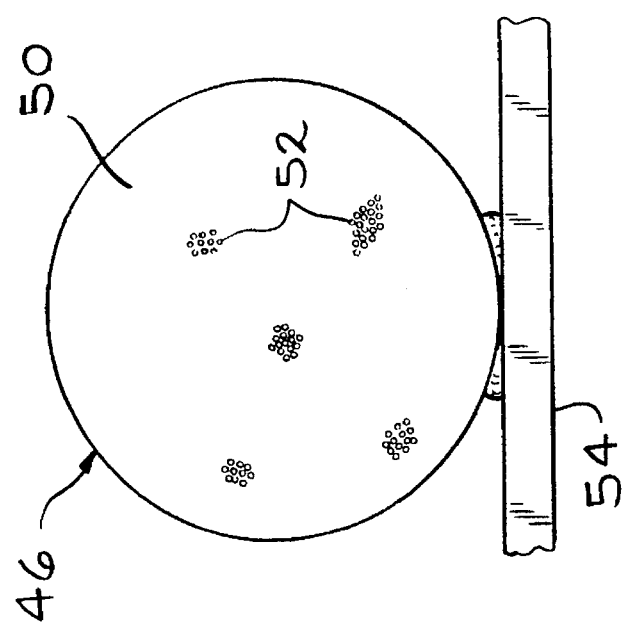
FIG. 4 is a schematic cross-sectional view in elevation of a nozzle of FIG. 2, taken along lines 4—4.

The invention will be described in terms of a glass fiber forming operation, although it is to be understood that the invention can be practiced using other heat softenable mineral material, such as rock, slag, and basalt.

It is to be understood that any organic material capable of being fiberized can be supplied to the apparatus used with the invention. Particularly useful examples of polymers include such higher molecular weight polymeric material as polyethylene terephthalate (PET), polypropylene or polyphenylene sulfide (PPS). Other organic materials possibly suitable for fiberization include nylon, polycarbonate, polystyrene, polyamide, resins, various polyolefins, asphalts and other thermoplastic and thermoset materials.

As shown in FIG. 1, glass spinner 10 rotates about axis of rotation 12 and is driven by the rotation of glass spindle 14. The glass spinner can be cast from a nickle/cobalt/chromium alloy as is known in the art. The spinner peripheral wall has numerous orifices 16 for the centrifugation of glass fibers, and preferably has between about 2,000 and about 50,000 orifices.

The glass spinner is supplied by molten stream of glass 18, which is centrifuged through the walls of the spinner in the form of glass fibers 20. The glass fibers are maintained in a soft, attenuable state immediately outside the spinner by the heat from annular burner 22, although in some glass fiber operations an external burner is not required. The radially-traveling glass fibers are turned down by annular blower 24 into a cylindrically shaped veil 26 of fibers, traveling downwardly, i.e., in the direction of the axis of the spinner. The process for creating the downwardly moving cylindrical veil of glass fibers is well known in the art.

Positioned beneath the glass spinner is a delivery system for distributing molten organic material into contact with the veil from a position within the veil. The delivery system includes a plurality of individual conduits or pipes 28 for directing a plurality of streams of molten organic material radially outwardly toward the veil of glass fibers. The pipes are preferably mounted for rotation in cylindrically-shaped polymer spindle 30, which can be mounted to the bottom of the glass spinner 10. Preferably, the polymer spindle is mounted in a manner which minimizes physical contact with the glass spinner to reduce the thermal heat transfer by conduction to the polymer material and the polymer distribution apparatus. To that end, the polymer spindle is preferably adapted with a mounting bracket 32 having spacing nubs 34 to reduce conductive heat transfer from the glass spinner, as shown in FIG. 2. The spindle length is sufficient to enable the introduction of the polymer fibers at a desirable height in the veil. If the polymer fibers are distributed too high, the polymer fibers may be degraded and may penetrate and flow through the veil.

In addition to the individual pipes, the delivery system includes a first conduit, such as delivery conduit 36, for establishing a downwardly moving flow of molten organic material within the veil and directing the flow of molten organic material toward the individual pipes. The delivery conduit can be any suitable conduit for delivering the molten organic material downwardly through the glass spindle 14 and the polymer spindle 30. An acceptable delivery conduit can be made of stainless steel, or any other suitable material. The molten polymer can be produced or supplied to the delivery conduit by using extruder equipment, not shown, commonly known to those in the art of polymeric materials, such as PET. The temperature at which the molten polymer material is supplied depends upon the nature of the polymer. Polypropylene is typically has a temperature of about 500° F. as it emerges from the extruder. Asphalt runs cooler at about 400° F., while PPS runs hotter at about 600° F. As an alternative to using the delivery conduit, the molten organic material can be dropped through the glass spindle and polymer spindle by gravity, in which case the first conduit is the combination of the glass and polymer spindles.

Figure 3:
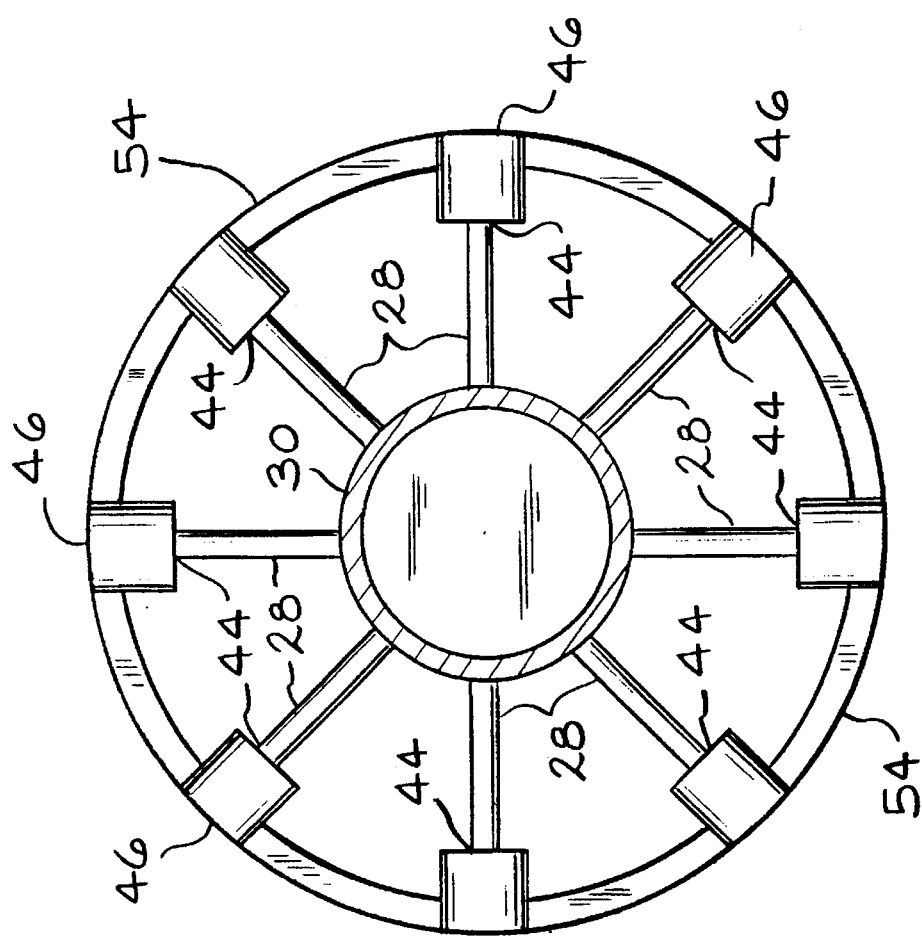
FIG. 3 is a schematic plan view of the conduits and nozzles of FIG. 2, taken along lines 3—3 of FIG. 2, without showing molten polymer.

As shown more clearly in FIGS. 2 and 3, the molten organic material, such as polymer 38, can be discharged into a material delivery chamber or well 40 at the bottom of the polymer spindle. The molten polymer exits the spindle via spindle openings 42, which divide the flow of molten polymer into a plurality of streams. Each stream flows radially outwardly away from the polymer spindle toward the veil through one of the pipes.

The pipes can be any conduits suitable for delivery of the polymeric material. Pipes successfully used in a commingling process with PET are one-quarter inch inside diameter stainless steel tubes. Preferably there are at least four pipes, and most preferably eight pipes, although more or less can be employed. The pipes can be mounted for rotation at the same rotational rate as the glass spinner, or at a different rate. Optionally, the pipes can be insulated, with a ceramic material or any other suitable material, to further minimize the effects of radiant heat and hot gases from the glass fiberizing process.

At the radially outward or distal end 44 of each pipe is a nozzle 46. The nozzles can be of any suitable shape or size for receiving molten polymer and centrifuging it into polymer fibers. The nozzles act as an individual discharge unit or module. The nozzles have a chamber 48 containing a reservoir of molten polymer, and a perforated discharge plate or peripheral wall 50 through which the molten polymer is passed to form polymer fibers.

Nozzles suitable for use with the invention can be made of stainless steel. As shown in FIG. 4, the nozzles can be circular in cross-section. The ratio of the area of the nozzle peripheral wall 50 to the cross-section of an individual pipe is preferably within the range of from about 10 to about 100, and more preferably within the range of from about 20 to about 50.

The nozzles are adapted with numerous orifices 52 for centrifuging the polymer fibers. The orifice diameters are typically within a range of from about 0.01 to about 0.05 inches, although larger or smaller diameters could be used, depending on the polymer viscosity, the rotation rate, and other factors. Preferably there are at least 50 orifices in each nozzle, and more preferably, at least 100. The porosity of the peripheral walls will vary, with the peripheral walls having an orifice area within the range of from about 5 to about 50 percent of the total area of the peripheral wall. More preferably, the orifice area is within the range of from about 15 to about 30 percent of the total area of the peripheral wall of the nozzles. In order to stabilize the nozzles, they can be connected together by an annular member such as support bar 54, as shown in FIGS. 2–4.

In operation, the molten polymer material flows down through the delivery conduit and into the well at the bottom of the polymer spindle. The molten polymer then flows radially outward through the rotating conduits and into the nozzles. Polymer fibers 56 are centrifuged and directed into contact with the glass fibers in the veil. The commingled polymer and glass fibers are collected on any suitable collection device, such as conveyor 58 as a commingled mass or mat 60.

Although the molten polymer material can be supplied to the apparatus entirely with a gravity feed, in one particular embodiment of the invention the polymer material is fed through a pressurized system. To accomplish this, the polymer delivery system is a closed system, and the extruder is operated to apply pressure to the molten polymer. A convenient and repeatable way to measure the pressure in the system is to employ a pressure transducer in the delivery conduit at a locus or pressure point 62 which is approximately 18 inches above or upstream from the top of the glass spinner. Preferably, the molten polymer at the pressure point 62 is at a gauge pressure of at least 50 psi (345 KPa), and more preferably at a gauge pressure of at least 100 psi (690 KPa). By pressurizing the system, the fibers can actually be extruded from the nozzles rather than merely centrifuged. This is advantageous because it enables higher fiberization throughputs.

Since the glass fibers and glass spinners operate at a temperature of approaching 2,000° F., the polymer fibers are rapidly thrust into a region of high temperature, causing the polymer fibers to soften. It has been found that some of the polymer fibers melt, forming droplets or other particles which attach themselves to some of the mineral fibers. Others of the polymer fibers retain their fibrous shape, resulting in the presence of polymer fibers in the final mineral fiber product. The reason that some of the polymeric material retains its fibrous shape, while other portions of the material form polymeric particles which attach themselves to the mineral fibers, is not known. It may be that some of the polymer fibers do not soften to the extent required to cause them to lose their fibrous shape and turn into a more spherical shape. Alternatively, it may be that although all polymer fibers are softened, only a portion of them come into contact with mineral fibers while in a softened condition.

Figure 5:
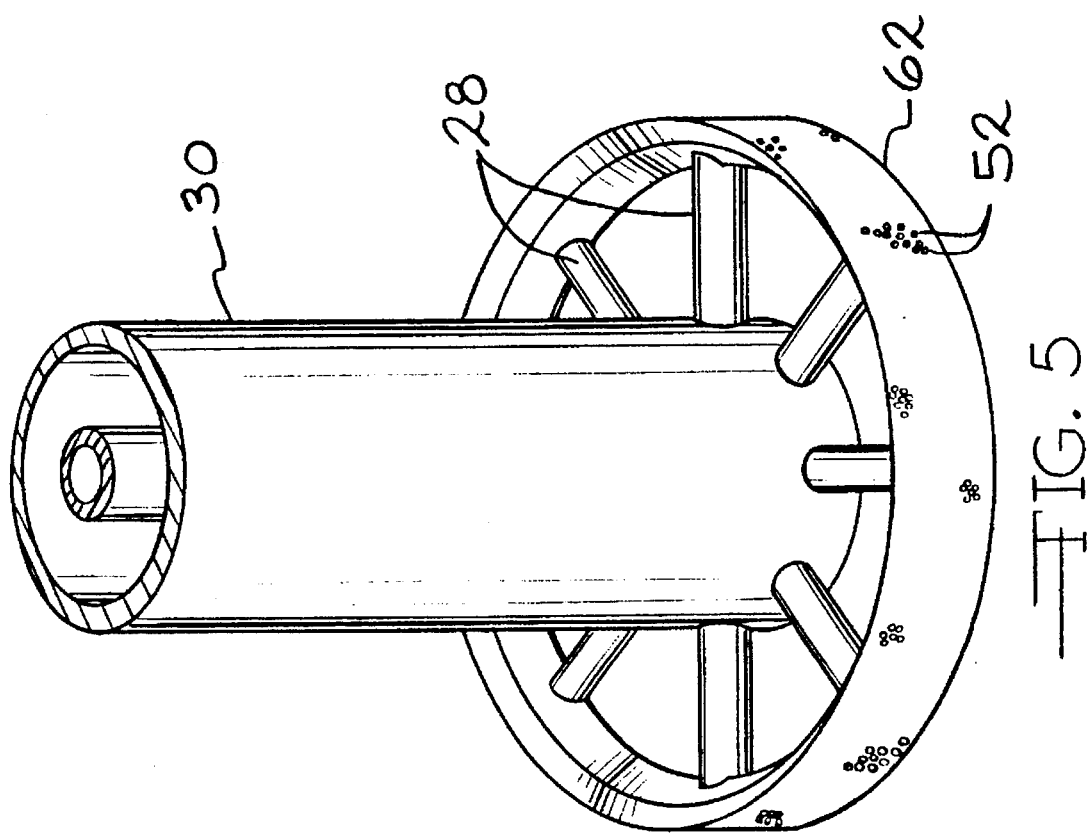
FIG. 5 is a schematic view in perspective of an embodiment of the invention in which the nozzle chambers connect to form an annular manifold.

As shown in FIG. 5, the nozzles can be connected to form a continuous annular manifold 62. The manifold is part of a closed polymer delivery system which is effective to prevent contact between the molten polymer and air or oxygen. Preferably, the peripheral wall of the annular manifold has at least 400 orifices.

It will be evident from the foregoing that various modifications can be made to this invention. Such, however, are considered as being within the scope of the invention.

INDUSTRIAL APPLICABILITY

The invention can be useful in the production of fibrous products of commingled glass and polymer fibers for use as structural and thermal insulation products.

We claim:

1. The method for fiberizing mineral material with organic material comprising:
   a. centrifuging mineral fibers from molten mineral material with a first spinner rotating about an axis;
   b. changing the direction of the mineral fibers to form a downwardly moving veil of mineral fibers;
   c. establishing a flow of molten organic material moving downwardly in a first conduit positioned within the veil, and directing the flow of molten organic material to a position beneath the spinner;
   d. dividing the flow of molten organic material into a plurality of streams;
   e. directing, by means of individual conduits, individual ones of the plurality of streams radially outwardly away from the first conduit:
   f. rotating the individual conduits about the axis;
   g. centrifuging organic fibers from the molten organic material by means of nozzles at the radially outward ends of the individual conduits; and,
   h. directing the organic fibers into contact with the veil of mineral fibers.

2. The method of claim 1 including restricting the flow of molten material through the nozzles so that no air enters the individual conduits.

3. The method of claim 1 in which the conduits are insulated.

4. The method of claim 1 in which the conduits act to shield the molten organic material from heat from the first rotating spinner.

5. The method of claim 1 in which the organic fibers are centrifuged through nozzle peripheral walls, the ratio of the area of the nozzle peripheral walls to the cross-sectional area of the individual conduits being within the range of from about 10 to about 100.

6. The method of claim 5 in which the ratio of the area of the nozzle peripheral walls to the cross-sectional area of the individual conduits is within the range of from about 20 to about 50.

7. The method of claim 1 in which the nozzles have an orificed peripheral wall with at least 50 orifices.

8. The method of claim 7 in which the nozzles have an orificed peripheral wall with at least 100 orifices.

9. The method of claim 1 comprising establishing the flow of molten organic material at a gauge pressure of at least 50 psi (345 KPa).

10. The method of claim 1 comprising establishing the flow of molten organic material at a gauge pressure of at least 100 psi (690 KPa).

11. The method of claim 1 in which the nozzles have orificed peripheral walls with an orifice area within the range of from about 5 to about 50 percent of the total area of the peripheral wall.

12. The method of claim 11 in which the peripheral walls have an orifice area within the range of from about 15 to about 35 percent of the total area of the peripheral wall.

13. The method of claim 1 in which the nozzles comprise an annular manifold having a peripheral wall with at least 400 orifices.

14. The method of claim 13 in which the peripheral wall has an orifice area within the range of from about 15 to about 70 percent of the total area of the peripheral wall.

15. The method of claim 13 comprising establishing the flow of molten organic material at a gauge pressure of at least 50 psi (345 KPa).

16. The method for fiberizing mineral material with organic material comprising:
   a. centrifuging mineral fibers from molten mineral material with a first spinner rotating about an axis;
   b. changing the direction of the mineral fibers to form a downwardly moving veil of mineral fibers;
   c. establishing a flow of molten organic material moving downwardly in a first conduit positioned within the veil, and directing the flow of molten organic material to a position beneath the spinner;
   d. dividing the flow of molten organic material into a plurality of streams;
   e. directing, by means of individual conduits, individual ones of the plurality of streams radially outwardly away from the first conduit to shield the molten organic material from heat from the first rotating spinner:
   f. rotating the individual conduits about the axis;
   g. centrifuging organic fibers from the molten organic material by means of nozzles at the radially outward ends of the individual conduits, the nozzles comprising chambers positioned at the radially outward ends of the individual conduits, and the nozzles having an orificed peripheral wall with at least 50 orifices and an orifice area within the range of from about 15 to about 70 percent of the total area of the peripheral wall; and,
   h. directing the organic fibers into contact with the veil of mineral fibers.

17. The method of claim 16 comprising establishing the flow of molten organic material at a gauge pressure of at least 50 psi (345 KPa).

18. The method of claim 17 comprising establishing the flow of molten organic material at a gauge pressure of at least 100 psi (690 KPa), where the nozzles have an orificed peripheral wall with at least 100 orifices and in which the ratio of the area of the nozzle peripheral walls to the cross-sectional area of the individual conduits is within the range of from about 20 to about 50.

19. The method of claim 16 in which the nozzles comprise an annular manifold having a peripheral wall with at least 400 orifices.

20. The method of claim 19 comprising establishing the flow of molten organic material at a gauge pressure of at least 50 psi (345 KPa).

* * * * *